Patented June 6, 1950

2,510,647

UNITED STATES PATENT OFFICE 2,510,647

POLYMERIC ACENAPHTHYLENE AND METHODS OF PREPARING THE SAME

Harry F. Miller and Ralph G. Flowers, Pittsfield, Mass., assignors to General Electric Company, a corporation of New York No Drawing. Original application September 26, 1944, Serial No. 555,895. Divided and this application April 1, 1948, Serial No. 18,487

6 Claims. (Cl. 260—33.2)

This application is a division of our copending application Serial No. 555,895, now U. S. Patent 2,445,181, filed September 26, 1944, and assigned to the same assignee as the present application.

The present invention relates generally to the production of polymers and copolymers of acenaphthylene. More specifically, the invention is concerned with the production of high molecular weight polymers of acenaphthylene and copolymers of acenaphthylene with compounds containing at least one polymerizable $CH_2=C<$ grouping.

Acenaphthylene, which is an unsaturated hydrocarbon of the formula

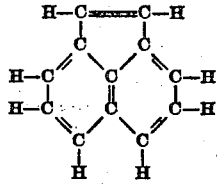

has heretofore been polymerized to polymers of low molecular weight (Ber. 47, 1685, 1914) by heating the acenaphthylene in solution, a short chain polymer of average molecular weight of the order of 3200–3300 being obtained. In accordance with the present invention polymers of acenaphthylene are produced which have high molecular weight of the order of at least 150,000. These polymers have high softening points and can be utilized at elevated temperatures for electrical insulation purposes.

Copolymers may also be produced in accordance with the present invention by polymerizing acenaphthylene with any compound containing at least one polymerizable $CH_2=C<$ grouping, illustrative examples of which are: vinyl compounds such as vinyl carbazole, vinyl ethers, vinyl esters, vinyl halides, vinyl phthalamide, acrylic acid, acrylic acid esters, methacrylic acid esters, acrylic acid nitrile; unsaturated hydrocarbons such as isoprene, vinyl acetylene, butadiene, isobutylene; propenyl methyl ketone; polymerizable aryl compounds having one or more unsaturated side chains such as p-methoxy-propenyl benzene, propenyl benzene, o-hydroxy styrene, divinyl benzene, and isoeugenol. Indene and indene derivatives also may be copolymerized with acenaphthylene.

In order that those skilled in the art better may understand how the present invention may be carried into effect, the following examples are given by way of illustration. All parts are by weight.

Example 1

A slow stream of $BF_3$ gas was passed through an ether solution of acenaphthylene containing 8.9 parts of the hydrocarbon at —50° C., the solution being allowed to warm up to 25° C. After standing four hours a precipitate formed. The polymer was reprecipitated from a benzene solution with methyl alcohol. Molecular weight determinations on the different chain length fractions of the polymer showed values of 183,000 and 341,000. Molecular weight measurements were made by the Mead and Fuoss method described in Jour. Phys. Chem., vol. 47, No. 1, January 1943, pp. 59–70.

Example 2

15 parts acenaphthylene in 100 parts (by volume) chlorbenzene were cooled to approximately 0° C. and $BF_3$ gas bubbled slowly through the solution. A white powder was obtained on dilution of the chlorbenzene solution with methyl alcohol. This product did not flow at 220° C. under a pressure of 30,000 pounds which is indicative of very high molecular weight polymers.

Example 3

31 parts of acenaphthylene in chlorbenzene solution were polymerized with a slow stream of $BF_3$ gas. The temperature was held below 0° C. for the reaction period (15 minutes) and a white product was obtained on dilution with methyl alcohol. This polymer was plasticized with Dowtherm A (diphenyl-diphenylene oxide eutectic mixture) and coated on 0.0004" plain kraft paper. After two weeks in an 80° C. oven the polyacenaphthylene coated paper still retained its original pliability.

Example 4

37 parts of a very high molecular weight polymer were obtained by polymerizing at —15° to —20° C., for 30 minutes, 50 parts of acenaphthylene in 140 parts (by volume) chlorbenzene with a very slow current of $BF_3$ gas. The polymer, which was a white product, was plasticized with α-methylnaphthalene and coated on 0.0004" kraft paper. A laminated product was made by pressing together at 160° C. and 20,000 pounds pressure 7 sheets of this polyacenaphthylene coated paper and used as the dielectric material in a capacitor. Measurements made on the capacitor showed an initial dielectric constant of 4.15 and power factors of 1.4% and 0.84% at 28° C. and 85° C. respectively. Leakage resistances at 28° C. and 85° C. were, respectively, 2,390,000 ohms/cm.[3] and 210,000 ohms/cm.[3]

Example 5

99 parts polyacenaphthylene were mixed with 20 parts polystyrene and 20 parts of α-methyl naphthalene as plasticizer in 400 parts (by volume) of trichloroethylene. The solution was used to coat 0.0004" kraft paper which was built up to 0.0012" with the resin. The material was laminated by stacking six sheets and pressing at 150–160° C. and 15,000 pounds pressure. The resulting product is a transparent sheet useful in making high frequency capacitors.

*Example 6*

9 parts acenaphthylene and 29 parts of vinyl carbazole were refluxed in benzene as a solvent and benzoyl peroxide as the catalyst for 48 hours in an oil bath at 100° C. The copolymer, twice precipitated from a benzene solution with methyl alcohol, was flesh colored and did not soften on the 200° C. hot plate. Nitrogen analysis showed the copolymer contained 19% acenaphthylene. An infrared absorption spectrum taken on this material as well as on pure polyvinyl carbazole and pure polyacenaphthylene showed that the product was a true copolymer. The copolymer is particularly adapted for use in high frequency electrical applications.

*Example 7*

30 parts of vinyl carbazole were copolymerized with 5 parts of acenaphthylene using benzoyl peroxide as the catalyst and benzene as the solvent, by heating in an oil bath at 100° C. for several days. The product was precipitated from the benzene solution as a white powder which did not melt on the 200° C. hot plate.

*Example 8*

500 parts of vinyl carbazole and 155 parts of acenaphthylene were copolymerized using benzoyl peroxide as the catalyst and benzene (650 parts by volume) as the solvent by heating the mixture for 168 hours in an oil bath at 105° C. The product, a white powder, was precipitated from the benzene solution, did not melt on the 200° C. hot plate, and was used to coat paper as described in Example 4.

*Example 9*

5 parts of acenaphthylene were copolymerized with 10 parts of styrene at about 0° C. using BF₃ gas for 30 minutes. This copolymer when coated on paper, possessed good laminating properties.

*Example 10*

1 part of acenaphthylene and 9 parts of vinyl acetate were copolymerized at 100° C. with benzoyl peroxide as the catalyst and precipitated as a white powder with methyl alcohol.

*Example 11*

1 part of acenaphthylene and 9 parts of methyl methacrylate were copolymerized at 100° C. using benzoyl peroxide as the catalyst. The product, precipitated from solution with methyl alcohol, was a white powder.

It will be understood by those skilled in the art that the invention is not limited to the production of copolymers of acenaphthylene with the particular compounds given in the above illustrative examples. Any compound containing at least one polymerizable $CH_2=C<$ grouping, numerous examples of which have hereinbefore been mentioned, may be used. In certain cases, instead of polymerizing a single organic compound containing a polymerizable $CH_2=C<$ grouping, the acenaphthylene may be copolymerized with a plurality of compounds each containing at least one polymerizable $CH_2=C<$ grouping. Thus, it is possible to obtain compositions comprising a mixture of interpolymers best adapted to meet particular service applications.

Although in the production of the copolymers illustrated in the foregoing examples, benzoyl peroxide and boron trifluoride have been indicated as polymerization catalysts, other suitable polymerization catalysts may be used. Benzoyl peroxide is usually the preferred catalyst for copolymerizations. Any suitable amount of catalyst may be used, but in general the catalyst concentration will be within the range of 0.1 to 1.0% by weight of the whole. The rate of polymerization and the properties of the final product vary with the time, temperature and with the catalyst and its concentration. Polymerizations may be effected at various temperatures depending on the catalyst used.

The proportions of monomeric constituents used in preparing the various copolymer products of the present invention are not restricted to the proportions given in the above examples. Various proportions of monomers may be used in preparing the copolymers, depending upon the type of copolymer desired and the use to which it is to be put.

The polymers and copolymers of the present invention may be used alone or with fillers, plasticizers or other modifying bodies compatible therewith. As noted in the examples, the high molecular weight polymers of this invention, as well as the copolymers, are adapted for use in coating paper and the like, for the production of laminated dielectric material for use in electrical devices, such as capacitors, the polymers and copolymers of the present invention being particularly adapted for use in high frequency electrical applications where high heat resistance is desired.

What we claim as new and desire to secure by Letters Patent of the United States is:

1. The method which comprises passing boron trifluoride through a solution of acenaphthylene at a temperature ranging from 0° to −50° C., and adding a non-solvent to the resulting solution thereby to obtain a high molecular weight polymer of acenaphthylene having a molecular weight between 150,000 and 341,000 when measured by the osmotic pressure method.

2. The method which comprises passing gaseous boron trifluoride through a chlorobenzene solution of acenaphthylene at a temperature of 0° C., and adding methyl alcohol to the resulting solution thereby to obtain a high molecular weight polymer of acenaphthylene having a molecular weight between 150,000 and 341,000 when measured by the osmotic pressure method.

3. The method of making a homopolymer of acenaphthylene which comprises passing gaseous boron trifluoride through a solution of acenaphthylene at a temperature ranging from 0° C. to −50° C. until a high molecular weight polymer of acenaphthylene is obtained, the said homopolymer having a molecular weight ranging from 150,000 to 341,000 when measured by the osmotic pressure method.

4. Homopolymeric acenaphthylene having a molecular weight of from 150,000 to 341,000 when measured by the osmotic pressure method and prepared by passing boron trifluoride through a solution of acenaphthylene at a temperature ranging from 0° to −50° C., and adding a non-solvent to the resulting solution thereby to obtain the aforementioned high molecular weight polymeric acenaphthylene.

5. A composition comprising (a) homopolymeric acenaphthylene having a molecular weight of from 150,000 to 341,000 when measured by the osmotic pressure method, and (b) as a plasticizer therefor alpha-methylnaphthalene.

6. A composition of matter comprising (a) homopolymeric acenaphthylene having a molecular weight of from 150,000 to 341,000 when measured by the osmotic pressure method, and (b) as a plasticizer therefor an eutectic mixture of diphenyl and diphenyl oxide.

HARRY F. MILLER.
RALPH G. FLOWERS.

REFERENCES CITED

The following references are of record in the file of this patent:

UNITED STATES PATENTS

| Number | Name | Date |
| --- | --- | --- |
| 2,317,878 | Bannon | Apr. 27, 1943 |

OTHER REFERENCES

Campbell et al., Article in J. Am. Chem. Soc., 58, 1051-2, (1936) abstracted in Chem. Abstr. 30, 5215 (1936).

Beilstein, Handbuch der organische Chemie, vol. V, page 299 (1930).

Beilstein, Handbuch der organische Chem., vol. V, page 530 (1943).

Dziewonski et al., abst. in Chem. abstr. 18, 982 (1924).